Oct. 3, 1950     M. B. SAWYER, SR., ET AL     2,524,361
INDUCTION MOTOR CONTROL
Filed Dec. 20, 1945     2 Sheets-Sheet 1
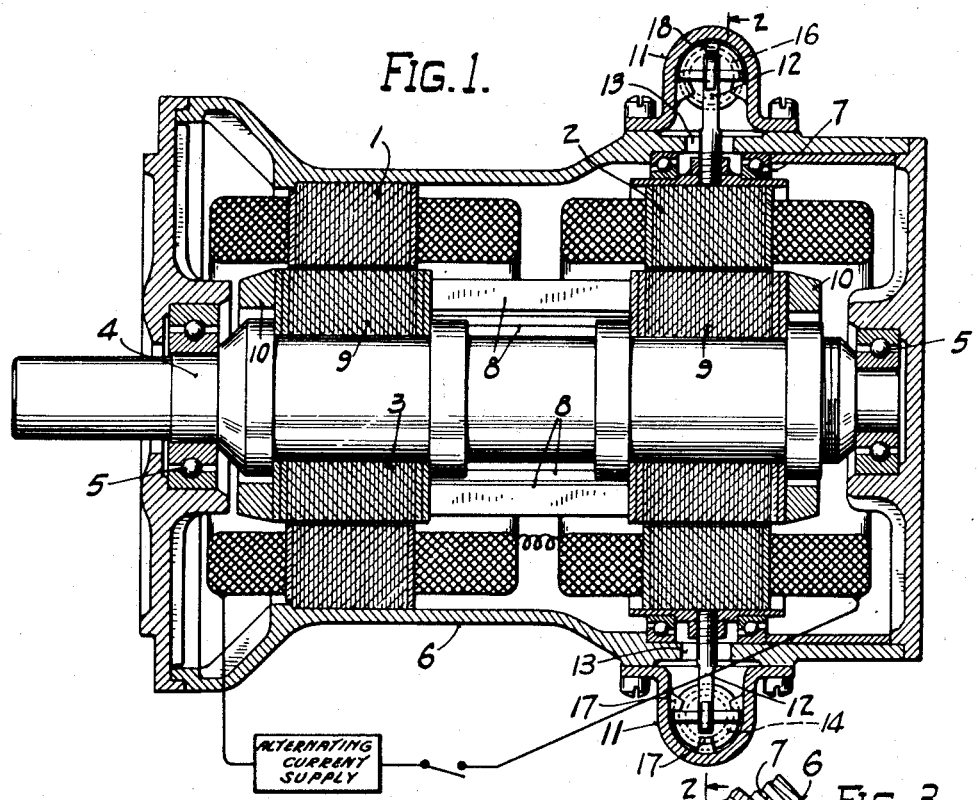
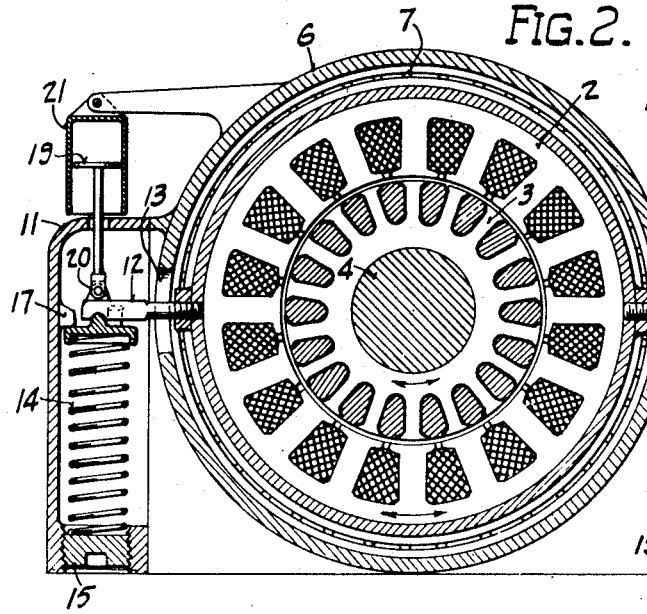
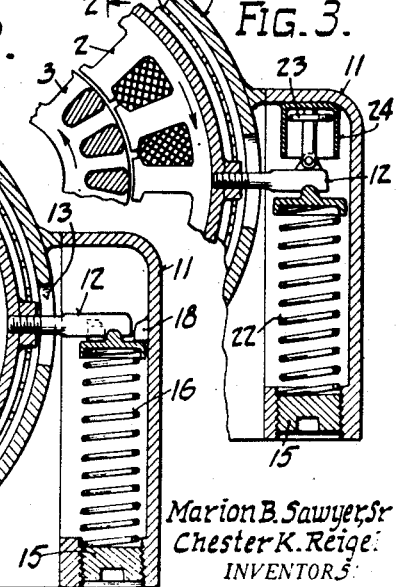
Marion B. Sawyer Sr
Chester K. Reige
INVENTORS
BY *[signature]*
ATTORNEY Marion B. Sawyer, Sr.
Chester K. Reigel
INVENTORS.

BY
ATTORNEY.

Patented Oct. 3, 1950

2,524,361

UNITED STATES PATENT OFFICE 2,524,361

INDUCTION MOTOR CONTROL

Marion B. Sawyer, Sr., Whittier, and Chester K. Reigel, Monrovia, Calif., assignors to A. O. Smith Corporation, Milwaukee, Wis., a corporation of New York Application December 20, 1945, Serial No. 636,234

5 Claims. (Cl. 318—243)

This invention relates to an electric motor.

The principal object of the invention is to provide automatic means for limiting the torque of the motor within a predetermined range of the required torque under a given load.

Another object of the invention is to construct an electric motor in which the range of torque values between that required as a maximum and the maximum permissible is less than heretofore.

Another object is to positively limit the torque of a motor and to compensate for substantial variations in line voltage and the like.

The invention has been applied to the construction of an induction motor for uses in which it is desired to limit the maximum torque to a value not greater than 25% above the required torque output. In most power supply circuits the variation in voltage, alone, is considerably greater than this range and will result in a torque having greater variations than the limit specified.

In carrying out the invention, the motor has either its stator or rotor or both constructed of a plurality of sections, at least one of which is biased against deviation from a maximum torque position by a predetermined force which provides for transmittal of the required torque output of the motor and which allows the given section to progressively recede from its position of maximum torque production to compensate for any increase in torque above that required. Ordinarily a spring is employed as the biasing means, but it is also possible to employ a fluid pressure cylinder or other construction for the purpose.

An embodiment of the invention is illustrated in the accompanying drawing in which:

Figure 1 is a longitudinal axial section through a reversible motor;

Fig. 2 is a transverse section of the motor taken on line 2—2 of Fig. 1;

Fig. 3 is a fragmentary section of a motor rotating in only one direction;

Figure 4:
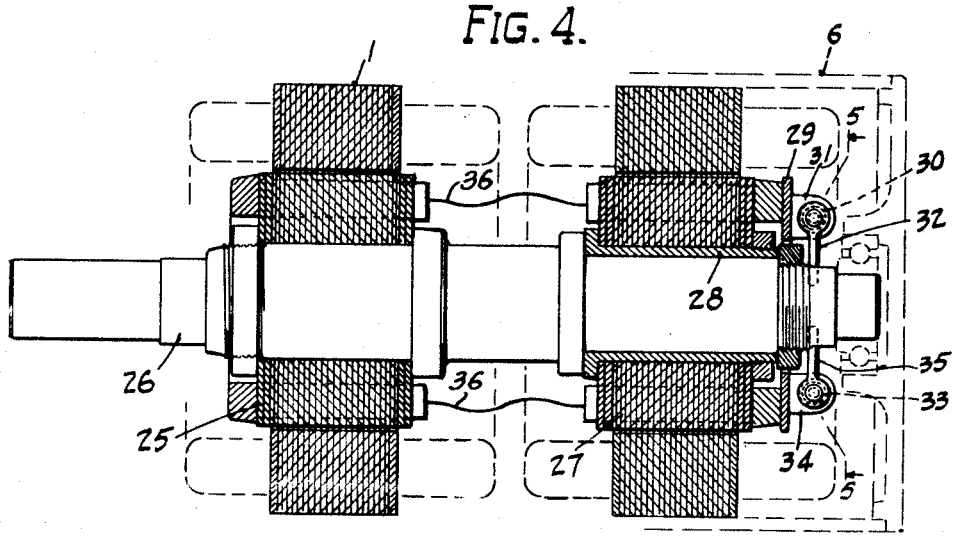
Fig. 4 is a detail sectional view, similar to Fig. 1 of a modified form of the invention.

The motor illustrated in Figs. 1 to 3 is constructed with two stator sections 1 and 2 encircling a common rotor 3 to drive the latter. The rotor 3 is mounted on the motor shaft 4 which rotates in bearings 5 in the ends of the motor housing 6.

The stator section 1 is fixed in the housing 6 while stator section 2 is mounted for limited rotary adjustment in the housing 6 by means of the bearing 7. The stator sections 1 and 2 are coaxial and in the particular embodiment they are of substantially equal size, being disposed end to end. The windings of sections 1 and 2 are in series with each other and are connected to a suitable source of alternating current.

The rotor 3 may be of the squirrel cage type with spaced longitudinal conductor bars 8 set in a laminated core 9 and end rings 10. In order to avoid cross currents and over-heating of the rotor the bars 8 should be insulated from the core 9.

Several embodiments of the invention are shown in the drawings. Figures 1 and 2 illustrate a motor in which the rotor is rotated in either a clockwise or counter-clockwise direction. Fig. 3 illustrates a motor in which the rotor rotates only counter-clockwise.

Referring now particularly to Figures 1 and 2 illustrating a reversible motor, the housing 6 has a housing extension 11 on each side thereof. The radial arms 12 respectively are secured at one end to stator section 2 on opposite sides of the rotor and each arm extends through bearing 7 and a slot 13 in the wall of housing 6, into the housing extension 11.

A coil spring 14 is disposed within housing extension 11 at the left side of the motor and extends between lever arm 12 and an adjustable plug 15 threaded into the lower end of the housing extension. A similar coil spring 16 extends between the lever arm 12 and a plug 15 within housing 11, at the right side of the motor.

The rotary adjustment of stator section 2 in the housing 6 depends on the torque being transmitted to the rotor, the spring 14 or 16 respectively through radial arm 12 biasing the stator to the position required to take care of the existing torque condition. The direction of biasing of the stator depends upon which direction the rotor 3 is rotating.

The stator section 2 is held in normal position in radial alignment with section 1 by the preloading of the springs 14 and 16 during all operations of the motor up to the maximum torque required and slightly in excess thereof. When the stators are in radial alignment the currents induced in the bars 8 of the rotor 3 by the rotating magnetic fields associated with the stator sections 1 and 2 are in phase with each other.

When the rotor 3 is rotating in a clockwise direction and the stator section 2 produces a substantial excess of torque on rotor 3 above the maximum required, the spring 14 at the left side of the motor allows the stator section 2 to rotate backward relative to section 1. When the stator section 2 has thus rotated out of radial alignment with the stator section 1 the rotating magnetic field associated with the stator section 2 induces currents in the conductor bars 8 which are out of phase with the currents induced therein by the rotating magnetic field associated with the stator section 1. This variation in the phases of the currents induced in the bars 8 decreases the torque output of the motor and keeps the total torque of the motor more nearly equal to the torque required. When the condition of the circuit causing the excess torque is changed to normal the spring 14 moves upwardly against the stop 17 where the two stator sections 1 and 2 are again in radial alignment and their magnetic fields rotating in radial alignment.

If the rotor 3 is rotating in a counterclockwise direction and the stator section 2 produces an excess of torque on rotor 3 above the maximum required then stator section 2 rotates backward or clockwise relative to section 1 to position the two sections out of radial alignment with each other, the arm 12 on the right side of the motor compressing spring 16. When the torque again reaches normal spring 16 moves upwardly against stop 18 where the two stator sections 1 and 2 are again in radial alignment.

In order to dampen vibration when the springs 14 and 16 are forced against the stops 17 and 18, respectively, upon return to normal torque operation, the motor is provided with the double acting piston 19.

As shown in Fig. 2 the piston rod is hinged to the arm 12 at the left of the motor as at 20 and extends through a hole in the housing extension 11 at the left side of the housing 6 to reciprocate the piston 19 within the cylinder 21. Cylinder 21 is pivotally connected to a bracket on motor housing 6.

When spring 14 moves upwardly to return to normal after compression, piston 19 is forced upwardly. When spring 16 on the right side of the motor moves upwardly to return to normal position the piston 19 is forced downwardly. The piston permits a slow return of springs 14 and 16 to normal position against their respective stops 17 and 18 and thus dampens vibration.

Fig. 3 illustrates an embodiment of the invention in which the rotor 3 rotates in only a counter-clockwise direction. The construction is similar to the previous embodiment in that a coil spring 22 is biased against a radial arm 12 extending from the stator section 2 and into the housing extension 11. The housing extension is closed at the bottom by the plug 15 which supports the spring 22.

In this embodiment a dash pot is provided within housing 11 and comprises piston 23 operating within cylinder 24. The piston 23 is hinged to arm 12. Besides operating to dampen vibration within the motor upon the return of spring 22 to normal position, the piston acts as a stop for the spring when the piston reaches its uppermost position.

Figure 5:
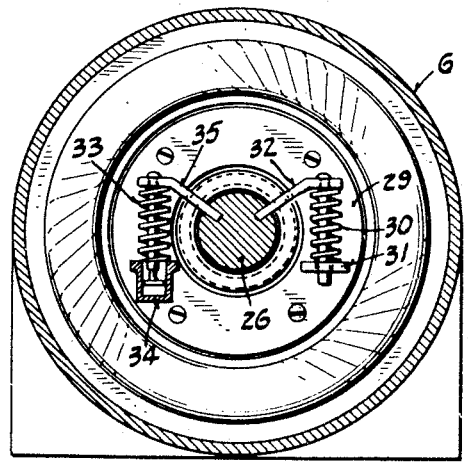
Fig. 5 is a transverse section taken on line 5—5 of Fig. 4.

Instead of employing two stator sections or in addition thereto it is possible to employ two rotor sections, one fixed to the shaft and the other mounted thereon for limited rotation relative to the shaft but transmitting its driving force thereto through a preloaded spring similarly to the mounting of stator section 2 in housing 6. Thus in the disclosures of Figs. 4 and 5 the rotor 25 is fixed on the left end of the shaft 26 and the rotor 27 on the right end of shaft 26 is mounted on the sleeve 28 which is rotatable on the shaft. End plate 29 is secured to the end ring of the rotatable rotor section 27. A spring 30 to the right of shaft 26 in Fig. 5 is interposed between a lug 31, secured to end plate 29, and an arm 32 which projects from shaft 26. A spring 33 to the left of shaft 26 in Fig. 5 is interposed between a dash pot 34, secured to the plate 29, and an arm 35 which projects from shaft 26. Springs 30 and 33 are compressed to adjust the torque condition of the motor to operating conditions the same as 14 and 16 shown in Fig. 2. Each of the conductor bars of the rotor 25 is connected by a flexible lead 36 to the corresponding conductor bar of the rotor 27, so that the connected conductor bars are in line with each other when the rotors are in radial alignment.

Various embodiments of the invention may be employed within the scope of the claims.

We claim:

1. An electric induction motor comprising two separate stator sections normally in radial alignment with their magnetic fields rotating in synchronism with each other, and a rotor therefor rotatable in either a clockwise or counter-clockwise direction, one of said stator sections being rotatable relative to the other to a position out of radial alignment therewith to decrease the voltages induced in said rotor, a housing for said motor, a spring based in said housing at one side of the motor and biasing said movable stator section toward normal position when the rotor is rotating in a clockwise direction, and a corresponding spring based in the housing on the other side of the motor and biasing said movable stator section toward normal position when the rotor is rotating in a counter-clockwise direction, said springs being pre-loaded to hold said stator in normal position for all torque values regardless of the direction of rotation of said rotor up to substantially the maximum torque required and to allow slippage of the stator when the torque values exceed substantially the maximum torque required.

2. An electric induction motor comprising two separate stator sections disposed during starting and normal operation in radial alignment and their magnetic fields rotating in phase with each other, and a rotor therefor, one of said stator sections being rotatable relative to the other to positions out of radial alignment therewith to decrease the voltages induced in said rotor, a housing for said motor, and a spring based in said housing and biasing said movable stator section toward radially aligned position, said spring being pre-loaded to hold said stator section in radially aligned position for all torque values up to substantially the maximum torque required and to allow slippage of the stator when the torque values exceed substantially the maximum torque required.

3. An electric motor comprising a rotor member and a stator member, one of said members having two sections of torque transmittal disposed in radial alignment during starting and normal operation of said motor, one of said sections being disposed to rotate relative to the other section causing the rotating field associated with said one section to induce currents in conductors of the rotor member which are out of phase with those currents induced in said conductors by the rotating field associated with the other section, and means biasing said one section toward radially aligned position with a force sufficient to transmit the maximum required torque but insufficient to prevent rotation of said one section for torque values above said maximum required torque to limit the maximum torque for said motor.

4. An electric motor comprising a rotor member and a stator member, one of said members having two sections of torque transmittal disposed in radial alignment during starting and normal operation of said motor, one of said sections being disposed to rotate relative to the other section causing the rotating field associated with said one section to induce currents in conductors of the rotor member which are out of phase with those currents induced in said conductors by the rotating field associated with the other section, means biasing said one section toward radially aligned position with a force sufficient to transmit the maximum required torque but insufficient to prevent rotation of said one section for torque values above said maximum required torque to limit the maximum torque for said motor, and a dash pot disposed in conjunction with said biasing means to dampen vibration when said sections return to radially aligned position.

5. An electric motor comprising a rotor member and a stator member, one of said members having two sections of torque transmittal disposed in radial alignment during starting and normal operation of said motor, one of said sections being disposed to rotate relative to the other section causing the rotating field associated with said one section to induce currents in conductors of the rotor member which are out of phase with those currents induced in said conductors by the rotating field associated with the other section, and a spring disposed to bias said one section toward radially aligned position, said spring being pre-loaded to hold said one section in radially aligned position for all torque values up to the maximum required torque and to allow said one section to rotate relative to the other section for torque values above the maximum required torque to thereby limit the torque of the motor.

MARION B. SAWYER, Sr.
CHESTER K. REIGEL.

REFERENCES CITED

The following references are of record in the file of this patent:

UNITED STATES PATENTS

| Number | Name | Date |
|---|---|---|
| 413,984 | Thone | Oct. 29, 1889 |
| 514,903 | Bradley | Feb. 20, 1894 |
| 905,713 | Krieger | Dec. 1, 1908 |
| 1,144,012 | Walton | June 22, 1915 |
| 1,893,112 | Swendsen | Jan. 3, 1933 |
| 2,151,460 | Bostwick | Mar. 21, 1939 |

FOREIGN PATENTS

| Number | Country | Date |
|---|---|---|
| 294,966 | Great Britain | May 16, 1929 |